Patented Mar. 5, 1940

2,192,326

UNITED STATES PATENT OFFICE 2,192,326

PHARMACEUTICAL

Ferdinand W. Nitardy, Brooklyn, N. Y., assignor to E. R. Squibb & Sons, New York, N. Y., a corporation of New York No Drawing. Application October 20, 1937, Serial No. 169,992

2 Claims. (Cl. 167—74)

This invention relates to liver preparations for the treatment of anemia.

A therapeutically-effective liver preparation has been obtained by autolyzing liver and concentrating the filterable material by desiccation; but this preparation has been seriously handicapped by its disagreeable taste and odor, suggestive of putrid meat, and by its comparative insolubility in water (its hygroscopicity causing the formation of lumps of powder surrounded by a layer of viscous concentrated solution, difficult to disintegrate and dissolve completely). Attempts heretofore made to improve its palatability, e. g., by means of various flavoring oils, cocoa powder, and the like, have been unsuccessful.

It is the object of this invention to provide a therapeutically-effective autolyzed-liver concentrate that has an agreeable taste and odor and is readily dissolvable in water, and a process of preparing it.

In the practice of this invention, there is added to the autolyzed-liver concentrate one or more substances capable of imparting thereto a cooked-meat flavor. Among such substances are glutamic acid and its salts, and pot liquors, gravies, and various other materials obtained by the heat-treatment of proteinaceous matter (especially meat and soybeans) in the presence of water. Preferably, an appropriate seasoning agent—for instance, salt, onion, and/or pepper—is also added.

Furthermore, the autolyzed-liver concentrate is rendered readily dissolvable in water by preparing it in granular form. The resulting product does not cake; and, when sprinkled on the surface of water, promptly dissolves, yielding a palatable drink, as acceptable as a clam-juice or tomato-juice cocktail.

The following examples are illustrative of the invention:

Example 1

Fresh, edible livers, which may have been frozen immediately on removal from the animal, are ground and mixed with 1/50-normal hydrochloric acid. A small amount of chloroform is added as a preservative. The mixture is incubated at 37° C., and autolysis is allowed to proceed for about 7 days. The solution is then filtered to remove any undigested material. A 600-gallon charge of the filtrate is evaporated down to a paste, e. g., to about 40 gallons; the paste (which contains about 150 lbs. of solids) is put into a drier, and the following flavoring agents are added:

| | |
|---|---|
| Mono-sodium glutamate_____lbs__ | 7.5 |
| Fluid acetic extract onion_____cc__ | 1360 |
| Fluid acetic extract black pepper_____cc__ | 27.2 |

The mixture is evaporated to dryness, with constant agitation, at a temperature not exceeding 120° F. and under a vacuum. The material starts to fluff on approaching dryness and assumes a porous consistency, requiring careful handling to avoid excessive bulk; the degree of fluffiness is controlled by decreasing the vacuum during the cooling. After reaching room temperature, the product is removed from the drier, and granulated, as by means of a Stokes granulator equipped with a screen constructed of 20-gage stainless steel perforated similarly to a nutmeg grater. Between 60% and 70% of the material is obtained in granules of the proper size (the fine material being returned to the drier and reworked with the next charge). Finally, the granules are placed on trays, and the moisture content is decreased to about 2.5% under a vacuum.

Example 2

4 kg. autolyzed-liver-concentrate powder is triturated together with 200 g. monosodium glutamate, and then moistened with a seasoning solution prepared by mixing 80 cc. fluid acetic extract of onion, 1.6 cc. fluid acetic extract of black pepper, 400 cc. alcohol, and 1600 cc. ether. Desirably, salt has been provided to taste, by reaction in situ during the preparation of the concentrate and/or by direct addition. The moist mixture is passed through a No. 8 sieve, collected on trays, and dried at 130° F.; and the product is then reduced to size by screening.

Example 3

4 kg. autolyzed-liver-concentrate powder and 200 g. monosodium glutamate are massed with the aid of a vehicle consisting of 2 parts by volume alcohol and 8 parts by volume ether. The mixture is dried, screened to the desired granule size, sprayed with a solution of 200 cc. fluid acetic extract of onion and 160 cc. fluid acetic extract of black pepper in 400 cc. alcohol, and dried under vacuum or in a current of dry warm air; the granulation being protected from moisture during the spraying.

The invention may be variously otherwise embodied—as with respect to the cooked-meat-flavor-imparting substances and the seasoning agents used—within the scope of the appended claims.

I claim:

1. A palatable antianemic preparation essentially comprising desiccated autolyzed-liver concentrate and a concentrated flavoring agent having a cooked-meat flavor.

2. The method of preparing an autolyzed-liver concentrate that is palatable and readily dissolvable in water, which comprises evaporating a mixture of an autolyzed-liver filtrate and a concentrated flavoring agent having a cooked-meat flavor under a vacuum down to a fluffy product, granulating the product, and bringing the granular product to substantially complete dryness.

FERDINAND W. NITARDY.